United States Patent Office 3,317,392
Patented May 2, 1967

3,317,392
PITUITARY GLAND EXTRACT
Samuel H. Eppstein, Charleston Township, Kalamazoo County, Mich., assignor to The Upjohn Company, Kalamazoo, Mich., a corporation of Delaware
No Drawing. Filed July 16, 1965, Ser. No. 472,710
2 Claims. (Cl. 167—74)

This application is a continuation-in-part of application Ser. No. 362,938, filed Apr. 27, 1964, now Patent No. 3,275,516.

This invention relates to processes of preparing a biologically active principle of glandular origin, more particularly processes of preparing prolactin from porcine pituitary glands.

Porcine pituitary glands are known to be a source of prolactin factor, which is useful in the maintenance of lactation in rabbits and rats, for breeding purposes and to increase broodiness in hens. Such factor also demonstrates protein anabolic activity. Biological assays are conveniently performed in pigeons by the method of Meites and Turner. J. Meites and C. W. Turner (1950), "Hormone Assay" (C. W. Emmens, ed.), page 252, Academic Press, N.Y. Assays are performed with standard ovine prolactin as comparison standard. The limited amount of porcine pituitary glands, their relatively high cost, and the complex problems of advantageously processing protein-like materials such as prolactin, make it imperative that improved processes be utilized. Especially is it desirable that handling of large volumes of aqueous solutions be avoided or simplified. Large volumes of aqueous solutions tend to be a deleterious dilution factor insofar as potency is concerned, and procedures in processing the same are necessarily time consuming and often require special apparatus, particularly if gel filtration techniques are used.

It has now been found in accordance with the present invention that the aforesaid prolactin of porcine pituitary glands can be conveniently and efficiently isolated from aqueous solutions thereof by adjustment of the said solutions to about the isoelectric point of the porcine principle. As reported by Eppstein, Nature, vol. 202, No. 4935, pp. 899–900, May 30, 1964, the isoelectric point by free boundary electrophoresis is approximately 4.97. In the presently improved process, advantage is taken of this finding to insolubilize the active principle over the pH range of from about 4.8 to about 5.1, preferably at pH 4.95. In aqueous solutions adjusted to this pH range, the active material is quite insoluble and is separated from the soluble aqueous portion by convenient techniques such as decantation, centrifugation, and the like. The prolactin present in the separated insoluble material is recovered therefrom, advantageously by dialysis and lyophilization of the dialyzed solution to a dry, water-soluble powder.

As aforesaid, the aqueous solution for isoelectric precipitation is one containing the prolactin principle of porcine glands. Such solution can be for example, the spent aqueous acidic liquor or filtrate after removal on oxycellulose of other biologically active principles of the pituitary, e.g., adrenocorticotropin; a neutral aqueous solution of an alcohol-precipitated prolactin; or an alkaline solution of the prolactin. The details of processing will vary somewhat depending upon the starting material. However, the essential technique of the instant invention is employed, i.e. adjustment by addition of alkali or acid as required to obtain a pH within the range of about 4.8 to 5.1, preferably 4.95. When alkali is required, sodium hydroxide, preferably a 0.1 N to 2 N solution is used whereas when acid is required, hydrochloric acid, preferably a 0.1 N to 2 N solution is used.

An acidic spent liquor can be obtained by extracting 400 gm. of defatted, dehydrated porcine pituitary glands with 8 liters of 0.1 N acetic acid. The whole is filtered and the residue is washed with 2 liters of 0.1 N acetic acid. The filtrate and washings are combined and oxycellulose is added thereto for removing other biologically active factors, e.g., adrenocorticotropin. About 9 liters of spent liquor or filtrate is obtained after removal of the oxycellulose.

An alcohol precipitated prolactin can be obtained by adding an equal volume of denatured alcohol to a neutral clarified aqueous solution containing the active principle at a temperature no higher than about 10° C. After settling and decantation, insoluble solids are recovered at the centrifuge, dialyzed against purified water, and lyophilized to yield a water-soluble powder (50 to 60 gm. per 400 gm. of defatted glands). This can be dissolved in neutral aqueous solution for isoelectric adjustment according to the instant process.

Prolactin is soluble at an alkaline pH, e.g., about pH 10, and such a solution can be used herein for isoelectric purification.

The following examples are illustrative but not limiting and set forth the best mode contemplated by the inventor of carrying out his invention.

EXAMPLE 1

Thirty-five grams of pooled soluble powder obtained by alcoholic precipitation was dissolved by suspending in 1400 ml. of deionized water (25 gm./liter) and bringing to pH 11 by dropwise addition of N NaOH. After ~2 minutes at this pH the solution was lowered to pH 8 by dropwise addition of N HCl. The turbid brown solution was clarified by centrifuging and the precipitate discarded.

The supernatant solution was brought to pH 4.95 by addition of N HCl and stirred for ~30 minutes to assure complete equilibration at this pH. This heavy slurry was centrifuged and the supernatant was discarded. The precipitate was again dissolved by suspending in water and raising the pH to about 10. The pH was again lowered to 4.95 as before and after approximately one-half hour of equilibration at this pH, the slurry was centrifuged. The precipitate was dialyzed against purified water in cellophane bags at 4° C., redissolved by adding N NH$_4$OH to clarify (pH about 9) and dried from the frozen state. The product weighed 15.4 gm. In a spot assay this material showed 14 I.U. prolactin per mg.

EXAMPLE 2

11.3 liters of spent liquor (0.1 M acetic acid filtrate of the oxycellulose adsorption of porcine (ACTH) was brought to pH 10.5 with 2 N NaOH and then adjusted to pH 7.9. The slurry was filtered with the help of diatomaceous earth and the filter cake washed once with water. The total volume of filtrate plush washings was 14,900 ml. An aliquot of 500 ml. was removed and precipitated at pH 4.95. Yield after dialysis and lyophilization was 1.94 gm. assaying 11 I.U./mg.

EXAMPLE 3

Approximately 13 liters of acidic spent liquor was adjusted to pH 4.95. The resulting slurry was held at 4° C. for 24 hours at which time a heavy precipitate had accumulated leaving a still very turbid supernatant. Standing for an additional 72 hours did not materially improve the settling. The supernatant was siphoned off and centrifuged. The total precipitate was dissolved at pH 3.5 and reprecipitated at pH 4.95. This precipitate settled rapidly and was separated as a slurry by decantation after standing for 16 hours. The slurry was centrifuged and the precipitate again dissolved at pH 3.5 and reprecipitated at pH 4.95. After recovery at the centrifuge, the precipitate was dialyzed as a suspension against purified water at 4° C., then dissolved by addition of N NH₄OH to about pH 9 and lyophilized. The resultant soluble powder weighed 114.5 gm.

EXAMPLE 4

Fractionation of 4 gm. of crude prolactin (alcoholic precipitate) over Sephadex G-75 yielded a prolactin-containing fraction of 1,650 ml. This was brought to pH 4.95 with N HCl. The precipitate was harvested by centrifugation, dissolved in 50 ml. of water by adjustment to pH 9 and then was dialyzed and lyophilized. Yield was 867 mg. assaying 36 I.U./mg. by spot assay.

EXAMPLE 5

Fractionation of a doubly precipitated (pH 4.95) crude prolactin obtained from alcoholic precipitation was carried out over dimethylaminoethyl cellulose. Fraction 122.2, measuring 2.8 liters, was adjusted to pH 4.95 and the precipitate allowed to settle whereupon it was collected by decantation and centrifugation as 122.2P, which was dialyzed and lyophilized. Yield 5.4 gm.

EXAMPLE 6

An effluent fraction obtained from a DEAE-cellulose purification of porcine prolactin, measuring 1460 ml., was adjusted to pH 5.00. The precipitate, 1.6P, was harvested by centrifugation, dissolved in a small volume of water at pH 9 and dialyzed and lyophilized. Dry weight was 5.56 gm. Assay showed 18 I.U./mg.

The electropherogram obtained by disc electrophoresis (L. Ornstein, preprint from Canalco, 4935 Cordell Ave., Bethesda, Md.) showed that the protein bands associated with porcine prolactin were very strong in the isoelectric precipitate. In contrast the solids from the supernatant fraction showed only traces of prolactin but considerable amounts of three faster-moving components.

EXAMPLE 7

The trailing portion of a descending limb of a prolactin peak obtained by diethylaminoethyl cellulose fractionation, measuring 1065 ml., was adjusted to pH 4.95. Weights and activities of the dialyzed-lyophilized precipitate and supernatant were as follows:

|                 | Weight, mg. | Activity, I.U./mg. |
|-----------------|-------------|--------------------|
| 4.95 precipitate | 76.6       | 10                 |
| 4.95 supernatant | 10.9       | 3                  |

EXAMPLE 8

Aqueous acidic spent liquor was adjusted to pH 10-10.5 (2N NaOH). After lowering to pH 7 (N HCl) the precipitate was removed by filtration. The cake was washed once with enough water to make a thick slurry and the washings and filtrate were combined and chilled to about 4° C.

One volume of chilled 95% alcohol (SD-3A) was slowly added with stirring, maintaining the temperature below 6° C. After standing in the cold overnight the bulk of the supernatant was siphoned off and the precipitate harvested by centrifugation at 0° C. The precipitate was slurried with ice water, dialyzed at 4° C. for 24 hours to remove the alcohol, and dissolved by raising the pH to 10.5 and lowering to pH 7, clarifying by centrifugation. The volume of solution was approximately 2 liters (representing 10-13 liters of aqueous acidic liquor). This solution was then freeze-dried to yield a stable soluble powder.

Thirty-five grams of such soluble powder was dissolved (25 gm./1000 ml.) by raising the pH to 10-10.2 and lowering to pH 8. The solution was clarified by centrifugation at 15° C. The clear solution was adjusted to pH 4.95 by cautious addition of N HCl. The precipitate was separated by centrifugation at 15° C., redissolved in 1000 ml. of water by raising the pH to about 9, and again precipitated by adjustment to pH 4.95. The precipitate obtained by centrifugation was dissolved in 500 ml. of water by adjustment to pH 8, dialyzed at about 4° C. for 24 hours, then freeze-dried from solution [after adjusting the pH to 8] to give the doubly precipitated soluble powder, 15.98 gm.

This powder was subjected to chromatography over diethylaminoethyl cellulose (DEAE-Cellulose) as follows: DEAE Selectacel (Brown Co.) was suspended in water and put through several cycles by alternately raising to pH 12 and lowering to pH 1. The "fines" were removed by decantation several times. The Selectacel was then brought to pH 8.2, filtered and washed with tris buffer [tris(hydroxymethyl)aminomethane] of pH 8.2 and ionic strength 0.1 containing 2% butanol by suspension in this buffer several times. Tris buffer of pH 8.2 and ionic strength ($\mu$) 0.1 was then passed through the column by gravity until the effluent was pH 8.2 and $\mu$ of 0.1. The column was now ready for use. For a column 2″ in diameter by 34″ long, 5 gm. of the doubly precipitated powder was used. This was dissolved in about 100 ml. of water by raising to pH 10, lowering to pH 8.2 and clarifying by centrifugation. The solution was applied to the top of the Selectacel column, washed in with butanol-containing tris buffer pH 8.2, $\mu$ 0.1. The flow rate was adjusted to collect 20 ml. of effluent/3 minutes. After tube 9, a linear gradient was established using 900 ml. each of tris buffer of 0.1 and 0.5 ionic strength. When this had entered the column, elution was continued with 2300 ml. of 0.5$\mu$ buffer. The column was then flushed with tris buffer of pH 8.2 containing 4 M NaCl. The main peak, almost symmetrical, was eluted between tubes 62-180. Cuts were made between tubes 75-105 (7116RFD27.2) and 106-135 (7116RFD27.3). These were dialyzed at 4° C. and freeze-dried from solution at about pH 8-8.4 (NH₄OH). Cut 2 assayed at 12 I.U./mg. and cut 3 at 11 I.U./mg.

What is claimed is:

1. In a process of preparing prolactin principle from porcine pituitary glands wherein the principle is solubilized in aqueous solution, the steps of adjusting the pH of said solution to from about 4.8 to about 5.1, separating soluble and insoluble portions thereof, and recovering said prolactin principle from the insoluble portion.

2. A process of preparing prolactin principle from porcine pituitary glands which comprises:
   (a) Mixing about equal volumes of ethyl alcohol and an aqueous solution of porcine pituitary gland prolactin principle of pH about 7 at a temperature below about 7° C. to precipitate said principle,
   (b) Dialyzing the principle against water at a temperature of from about 0° to about 20° C. and lyophilizing said dialyzed principle,
   (c) Preparing an aqueous solution of the lyophilized principle and adjusting the pH thereof to about 4.95, separating soluble and insoluble portions of the adjusted whole and recovering the insoluble portion thereof,
   (d) Preparing a solution of the recovered principle in an aqueous tris-(hydroxymethyl)aminomethane buffer of ionic strength 0.1 and pH 8.2 and applying said solution to diethylaminoethyl cellulose,
   (e) Eluting the diethylaminoethyl cellulose with tris-(hydroxymethyl)aminomethane buffer of pH 8.2 to establish a continuous linear gradient to ionic strength 0.5 and collecting fractional eluates therefrom, and
   (f) Combining fractional eluates having pigeon crop sac activity and absorption of ultraviolet light of wave length about 280 m$\mu$, removing salts and volatile material therefrom and lyophilizing the salt-free eluates.

No references cited.

ALBERT T. MEYERS, *Primary Examiner.*

LEROY B. RANDALL, *Assistant Examiner.*